Dec. 20, 1949     J. SIVERTSEN     2,491,693
PROPULSION SYSTEM
Filed Oct. 19, 1944     2 Sheets-Sheet 1
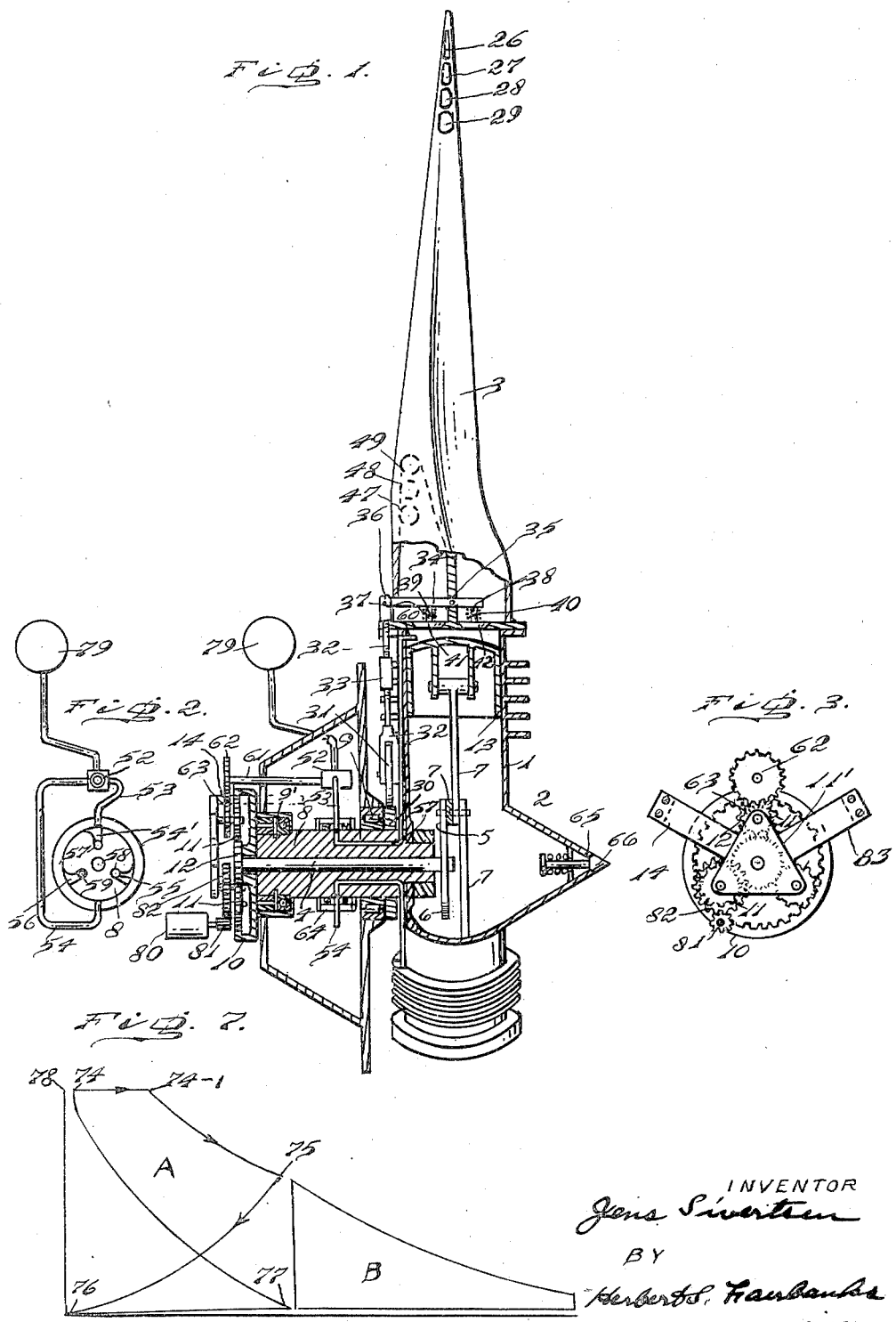
INVENTOR
Jens Sivertsen
BY
Herbert S. Fairbanks
ATTORNEY

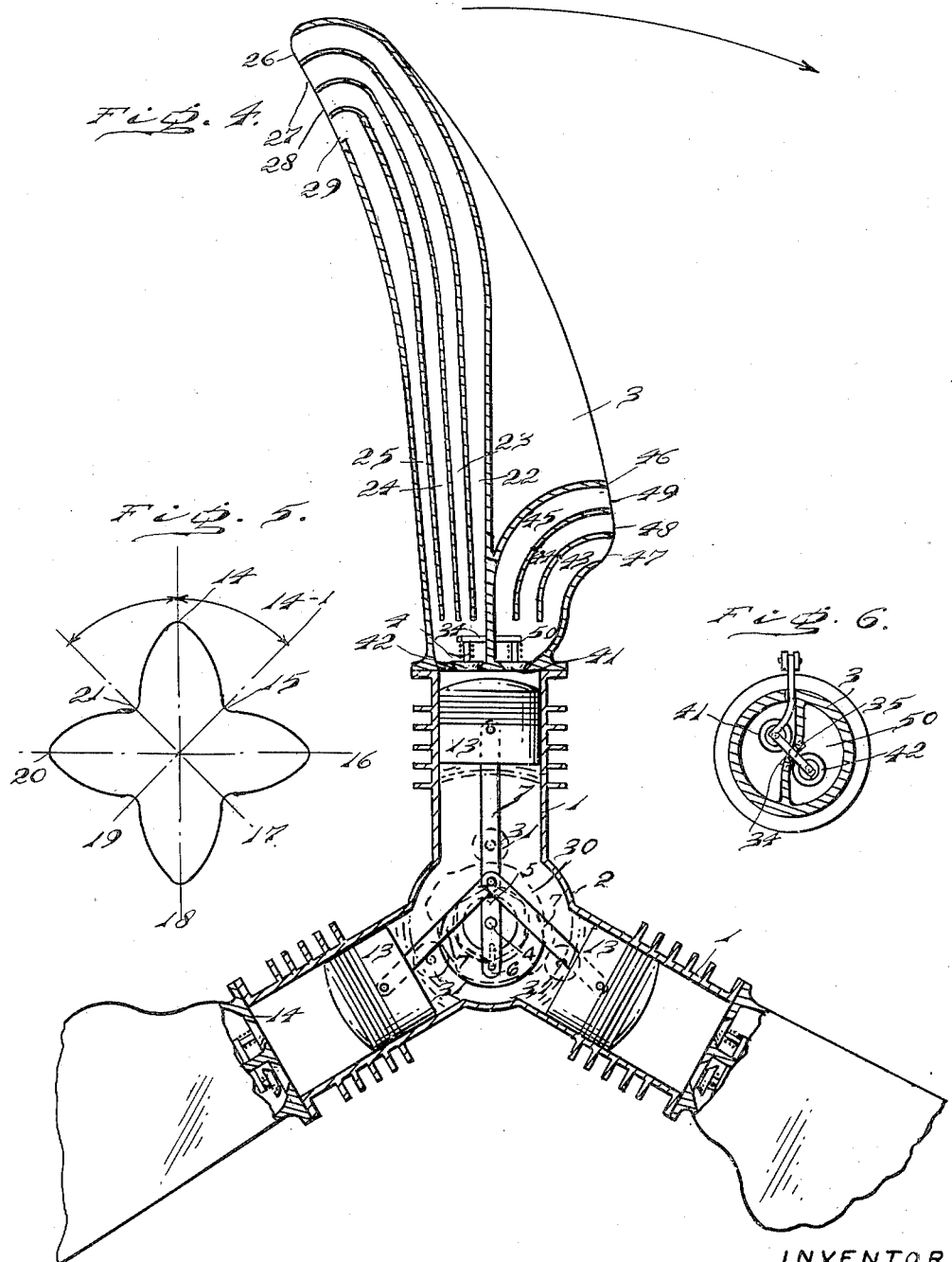

Patented Dec. 20, 1949

2,491,693

UNITED STATES PATENT OFFICE 2,491,693

PROPULSION SYSTEM

Jens Sivertsen, Philadelphia, Pa.

Application October 19, 1944, Serial No. 559,420

2 Claims. (Cl. 170—135.4)

Two systems are in use today for aircraft propulsion, namely, one using a motor driven propeller, and the other the jet propulsion system. There are advantages and disadvantages in both of these systems.

Jet propulsion has the advantage of relatively simple machinery and the disadvantage of a force-speed combination which is best suited for very high speeds or altitudes, or both. Where extremely high speed is desired, such as for example in flighter planes, transoceanic air lines and the like, there appears to be a need for the jet propulsion type.

The combination of a motor with a propeller as now known, is well suited for slow, or moderate to high speeds, and in many ways is an ideal system except for two features. In order to maintain an even drive on the propeller, many cylinders are required which are made of precision parts and therefore expensive. Furthermore, the motors are complicated with a large number of parts, and often the cost of the power plant exceeds that of the aircraft.

The present invention is primarily interested in making a simpler and cheaper power plant than those heretofore employed.

The energy is at a high speed but is utilized at a relatively low speed which is favorable to the propeller, thereby rendering the system practical for conventional airplanes and also the autogiro type.

With the foregoing and other objects in view as will hereinafter appear, my invention comprehends a novel propulsion system.

Other novel features of construction and advantage will hereinafter appear in the detailed description and the appended claims.

For the purpose of illustrating the invention, I have shown in the accompanying drawings, a preferred embodiment of it which, in practice, will give satisfactory and reliable results. It is, however, to be understood that this embodiment is typical only, and that the various instrumentalities of which the invention consists can be variously arranged and organized and the invention is not limited to the exact arrangement and organization of these instrumentalities as herein shown.

Figure 1 is a side elevation, partly in section, of a propulsion system, embodying my invention:

Figure 2 is a schematic view of the fuel injection system.

Figure 3 is an end elevation showing the gearing arrangement.

Figure 4 is an elevation, partly in section, showing more particularly the engine cylinders and blades.

Figure 5 is a diagram showing the pistons position relatively to their top and bottom positions in a cylinder during one rotation of the propeller.

Figure 6 is an end elevation of a valve arrangement.

Figure 7 is a power diagram.

Similar numerals of reference indicate corresponding parts in the drawings,

Referring to the drawings:

It will be understood from Figure 4 that the system has a desired number of cylinders 1, symmetrically located around a crank case 2, and the cylinders carry propeller blades 3.

The cylinders rotate together with a crankshaft 4, the latter being provided with a crank 5 and a counterweight 6.

7 are connecting rods balanced by the counterweight 6, which also balances the crank 5 and the pistons 13.

The crank case 2 is rigidly fastened to the main shaft 8 which is free to rotate in a roller bearing 9 and a ball bearing 9', the bearings being also arranged to take the thrust. An internal gear 10 is fastened to the main shaft 8 and engages three gears 11 which mesh with a gear 12 on the crank shaft 4. The gears 11 are mounted on a spider 11' which cannot rotate but is bolted solidly to the frame of the motor by means of arms 83 and conventional fastening devices. It will be apparent that when the shaft 8 and attached cylinders and propeller blades rotate, the crank shaft 4 and gear 12 will also rotate but in the opposite direction. The speed will also be different. In the selected drawing, the ratio between the pitch diameter of the gear 10 and the gear 12 is three, therefore the speed of rotation of the shaft 4 is three times that of the shaft 8 and in the opposite direction. The effect of this on the relative positions of the pistons 13 and the top of the cylinders 1 is such that each piston will be near the top four times during one rotation of the main shaft 8 and attached propeller blades 3, as shown schematically in Figure 5.

At the angular position 14 of the propeller blade, the cylinder contains compressed air and injection of fuel starts. The explosion starts with the ignition of the fuel and continues as long as fuel is injected. After 45° rotation of the propeller blade, the piston reaches its bottom position, and at this time or earlier the exhaust valve opens as will be explained in the operation of the cam and pressure diagram. The exhaust continues to the angular position 16 when the exhaust valve closes and the air inlet valve opens and the cylinder fills with air until position 17 is reached. The air is being compressed until position 18 is reached. The fuel injection and explosion takes place between 18 and 19, exhaust between 19 and 20, air inlet between 20 and 21, and compression between 21 and 14. We thus see that one cylinder completes the full four cycles of a conventional four cycle engine in one half turn of the propeller. A conventional cylinder arrangement uses two rotations to accomplish this. In other words if we only consider the number of impulses, one cylinder will provide four times as many impulses as a conventional cylinder during the same number of turns. However, this is only part of the advance made by this invention.

Due to the power derived in exhaust channels 22, 23, 24 and 25 in a propeller blade and from the jet action through jets 26, 27, 28 and 29 at the end of a blade, during the rotation period 15 to 16 and beyond point 16, we will double this proportion. In other words, the cylinder with attached propeller blade will give positive drive from 14 to 16, eight times as constant as a conventional cylinder. The three blade arrangement illustrated will give a smoothness of drive substantially equal to that of a twenty four cylinder engine. By selecting other combinations of gears 10 and 12, this smoothness can be further increased. This is a feature very important for auto-giros where we are even more interested in a low R. P. M. of the blades due to their physical dimensions. An increase in the number of cylinders and blades will also increase the smoothness of the drive. By using four cylinders, the torque will be a perfect force-couple which is completely balanced.

The valve and control arrangement are shown in Figures 1 and 4. A stationary cam 30 cooperates with rollers 31 carried by a fork 32 at the end of a stem guided by sleeves 33, rigidly fastened to a cylinder. The stem portion of the fork can move in and out as the contour of the cam demands. A rocker arm 34 rocks on its pivot 35 and is pivoted at 36 to the stem portion of the fork. By means of valve stems 37 and 38, and valve springs 39 and 40, an air inlet valve 41 and an exhaust valve 42 are opened and closed accordingly to the cycles previously described in a conventional manner.

When the propeller rotates, vanes 43, 44 and 45 act as a compressor on air taken in at the leading edge of a blade as at 46, through openings 47, 48 and 49. In the space 50 we will have an air pressure above that of the surrounding atmosphere. This compression will absorb power but this is true of any other type of compressor.

The fuel injection system is shown in Figures 1 and 2. 52 is an injection pump which may be a commercial or special pump. The type used is a two stage piston pump which delivers pressure to pipe lines 53 and 54 at predetermined intervals registering with openings 54', 55 and 56 which connect with the openings 57, 58 and 59 leading to injectors 60 at the tops of each cylinder. The pump 52 is driven by a shaft 61 from gear 62 meshing with gear 63, and thereby synchronizes the pump with the rotating propeller. The synchronization is such that pipe 53 will deliver three injections during one turn of the shaft 8, and pipe 54 will deliver three injections, making a total of six injections during one turn which agrees with our previous discussion of the cylinder cycles. A packing box 64 is preferably of the elastic diaphragm type, although any type of sealing device can be used.

The fuel injection system with its timing is also the ignition system. If it is desired to use spark plugs, the distributor system from the electrical system can be similarly arranged and coordinated with the spark and coil-condenser or magneto system.

The crank case has a valve seat 65 controlled by a springloaded valve 66. This takes care of any slip-by of gases around a piston. When the predetermined pressure is reached, the valve will open to allow the escape of the gas.

In Figure 7, I have shown schematically a pressure diagram for one cylinder. Point 74 corresponds approximately to point 14 in the piston position diagram Figure 5. Point 74—1 corresponds to a point in Figure 5 between 14 and 15. The selection of the exact location of this point will depend on a number of factors, such as type of plane, speed of plane, R. P. M. of propeller. However, if the area A is equal to the area B, we obtain a very even drive of the propeller.

Point 75 in Figure 7 corresponds to 15, Fig. 5; 76 to point 16; 77 to 17 and 78 to 18. At 74 fuel injection and ignition start. When all of the fuel is consumed at 74—1, the pressure falls approximately adiabatically as in a standard Diesel diagram. At 75, the exhaust valve opens with the piston near its bottom position, corresponding to point 15. It is to be understood that the description is only approximate since the fuel injection can start before we are completely at the top in a similar manner to the spark advance in a standard explosion motor. The exhaust valve may open before point 15.

When the exhaust valve 40 opens, the gases pass out and the pressure in the cylinder falls rapidly to 76. From 76 to 77 the air inlet valve is open and the pressure at 50 together with the vacuum created in the cylinder fills the cylinder with air from 77 to 78, and the cylinder is ready for another cycle.

If we go back in the cycle to 75 when the exhaust valve opened, we see that quite a lot of pressure or thermal energy is still unused. This pressure or energy developes speed through the channels 22, 23, 24 and 25. The pressure falls and the speed of the gases increases. At the same time the propeller is rotating. Due to the curvature of the channels, a large part of the kinetic energy developed will be imparted to the propeller, in a similar manner as this happens in an air or steam turbine. The channels 22, 23, 24 and 25 may have a decreasing cross section which will help to accelerate the gases and decrease the pressure. By the final curvature of these channels, we arrange for these gases to have a velocity 180° opposite to the movement of the propeller tip at this time. During this final stage, the gases act to give jet propulsion.

It will now be apparent that the relatively simple machinery herein described will act partly as a piston type engine, partly as a turbine and partly as jet propulsion, and the energy of all three is utilized to effect forward propulsion of the aircraft. It also acts as a compressor system and as a propeller.

The lubrication of the moving parts may be effected in any desired manner. For the purpose of illustration, I have shown the crankcase as containing lubricating material which is forced outwardly by centrifugal action as the blades revolve.

A fuel supply 79 leads to the injection pump 52. A starter mechanism of any desired type can be employed. For purposes of illustration, I have shown a starter motor 80, the shaft of which carries a gear 81 adapted to mesh with a gear 82 arranged to rotate with a gear 11.

An air craft is not absolutely necessary for a person to travel through the air. Due to the compact design, the power plant can be strapped to a man carrying a fuel supply on his back, and move through the air in a similar manner to an auto-giro. Due to the small horsepower necessary to lift and move a man and power plant totalling about three hundred pounds and attached to a pole with the propeller above his head, five horsepower would be sufficient to lift him straight up at a speed of approximately fifty miles per hour and much less would be required to move laterally through the air.

Having thus described my invention, what I claim as new and desire to secure by Letters Patent is:

1. In an aircraft propulsion system, a crankcase rotatably mounted, engine cylinders fixed to the crankcase, blades having their roots fixed to the cylinders, having means to admit air at their leading edges and having curved exhaust passages leading from their roots and terminating in jets at the trailing edges of the blades, the air admission means and the exhaust passages being in valved communication with the cylinders, pistons in the cylinders, a crankshaft, connecting rods rotatably mounted on the crankshaft and connected with the pistons, means to introduce fuel into the cylinders, means to time the operation of the valves, and means connected between the crankshaft and crankcase to rotate the crankshaft in an opposite direction to the direction of rotation of the blades.

2. A propulsion system, comprising a plurality of cylinders, a crankcase, a crankshaft in the crankcase, a piston in each cylinder, and connected with the crankshaft, all cylinders having their center lines intersecting at a common point, a propeller blade secured at its inner end to each cylinder and having curved intake and exhaust passages for said cylinder located respectively at the leading and trailing edges of said blade, the center line of said cylinders, pistons and blades being in a common plane, fuel feeding means for said cylinders, and means connected between the crankshaft and crankcase to rotate the crankcase in an opposite direction to the direction of rotation of the blades.

JENS SIVERTSEN.

REFERENCES CITED

The following references are of record in the file of this patent:

UNITED STATES PATENTS

| Number | Name | Date |
|---|---|---|
| 1,084,192 | Becker | Jan. 13, 1914 |
| 1,133,660 | Papin, et al. | Mar. 30, 1915 |
| 1,231,871 | Freytag, et al. | July 3, 1917 |
| 1,519,444 | Fales | Dec. 16, 1924 |
| 1,942,674 | Whitsett | Jan. 9, 1934 |
| 2,011,061 | Loescher | Aug. 13, 1935 |
| 2,229,500 | Goldsmith | Jan. 21, 1941 |
| 2,283,068 | Johnson | May 12, 1942 |
| 2,359,536 | Stucke | Oct. 3, 1944 |

FOREIGN PATENTS

| Number | Country | Date |
|---|---|---|
| 20,813 | Great Britain | Sept. 7, 1910 |
| 177,225 | Great Britain | Mar. 17, 1922 |
| 408,033 | France | Mar. 16, 1910 |